United States Patent Office 3,351,474
Patented Nov. 7, 1967

3,351,474
GLASS COMPOSITIONS RESISTANT TO DISCOLORATION, METHOD OF MAKING AND ARTICLES PRODUCED THEREFROM
Erwin C. Hagedorn, Oregon, and Dallas P. Hall, Toledo, Ohio, assignors to Owens-Illinois, Inc., a corporation of Ohio
No Drawing. Filed Dec. 16, 1963, Ser. No. 330,623
11 Claims. (Cl. 106—52)

ABSTRACT OF THE DISCLOSURE

Method of making glass compositions and glass containers which resist undesirable browning discoloration when the glass is subjected to sterilizing radiation wherein about 0.10 to about 0.40% by weight of CuO based on the base glass is incorporated into the base glass composition.

---

The present invention relates to glass compositions and methods of making glass compositions that are resistant to discoloration caused by exposure to radiation. The present invention also relates to glass articles that are resistant to the undesirable discoloration caused by subjecting the articles to sterilizing radiation.

Radiation is often employed for sterilizing a wide variety of products, including pharmaceutical preparations such as drugs, medical preparations, serums, vaccines, pills, and the like. Similarly, it is often desirable to subject foods and associated goods to sterilizing radiation.

Ordinary glasses such as soda-lime glasses and borosilicate glasses, most commonly employed for making containers, are highly susceptible to discoloration when exposed to radiation. When these glass containers are exposed to high energy radiation, they tend to undergo an undesirable change in color producing an unsightly brown color which has been termed "browning" in the art. Consumers are reluctant to purchase products packaged in discolored containers for fear that the contents are damaged or spoiled.

In an effort to overcome the disadvantages associated with the ordinary glasses which tend to discolor as described above, glass compositions have been developed wherein various ingredients are added to prevent or mask any undesirable discoloration that may occur. Certain disadvantages are associated with the use of known glass compositions, however, including relatively high cost of some materials.

Accordingly, it is an object of the present invention to reduce the tendency of glass to undergo an undesirable discoloration caused by exposure to sterilizing radiation.

It is another object of the present invention to provide glass compositions resistant to undesirable discoloration caused by exposure to sterilizing radiation and which avoid the disadvantages of the prior known methods and compositions.

It is a further object of the present invention to provide glass compositions that are resistant to undesirable discoloration caused by sterilizing radiation and which avoid the use of expensive materials.

It is a further object of the present invention to provide glass containers that are resistant to discoloration caused by exposure to sterilizing radiation.

It is a further object of the present invention to provide a method for making glass compositions that are resistant to undesirable discoloration caused by sterilizing radiation.

In attaining the above objects, one feature of the present invention resides in having present in the glass, a particular amount of copper oxide, CuO, whereby the desired resistance to discoloration is obtained.

Copper oxide, CuO, present in the glass composition in an amount of at least 0.10% by weight based on the weight of the base glass composition significantly improves the properties of the glass in reducing the tendency to undergo undesirable discoloration known as "browning" when exposed to radiation.

Another feature of the present invention resides in the glass containers which have improved resistance to undesirable discoloration when subjected to radiation sterilization operations. The tendency of the glass containers to discolor is substantially lessened by having present in the glass a sufficient amount of CuO. The resulting glass containers can be employed for packaging a wide variety of materials that are desirably sterilized by exposure to radiation.

Other objects, features and advantages of the present invention will become apparent from the following detailed description thereof.

According to the present invention, ordinary glass compositions, such as soda-lime glasses and borosilicate glasses, for example, can be modified so as to resist undesirable discoloration which normally occurs when these glasses are exposed to radiation. Properties of the base glass composition are altered by the presence of CuO so that the glasses exhibit substantially decreased tendency to undergo the undesirable browning discoloration which appears in ordinary glasses upon being exposed to radiation. The CuO is present in a total amount of at least about 0.10% by weight based on the weight of the base glass composition. Generally, the CuO can be present up to about 0.40% by weight.

The glass compositions of the present invention can be employed for making containers of all types, particularly for the pharmaceutical and food industries where it is desirable to subject the containers to radiation sterilization operations. Discoloration resistant containers made from relatively inexpensive base glasses thus represent a substantial savings and advantage over the use of more expensive containers.

Radiation normally employed for purposes of sterilization includes gamma rays and X-rays as well as other types of radiation. Sterilizing radiation methods are widely known and are described in various publications. The intensity and dosage of the sterilizing radiation, as well as other factors involving the radiation of the products are factors that are equally well known in the pharmaceutical and food industries.

The following examples are for purposes of illustrating the present invention and are not considered limiting thereof in any way.

*Example I*

This example illustrates the undesirable discoloration that results when ordinary glass is exposed to radiation. A borosilicate base glass composition was employed containing the following ingredients by weight.

| | |
|---|---|
| $SiO_2$ | 74.60 |
| $B_2O_3$ | 9.50 |
| $Al_2O_3$ | 5.50 |
| $Na_2O$ | 6.60 |
| $K_2O$ | 0.60 |
| $CaO$ | 0.90 |
| $BaO$ | 2.20 |
| $Fe_2O_3$ | 0.05 |
| $Cl$ | 0.20 |
| $F$ | 0.10 |

A sample of the above glass was subjected to X-ray exposure of about $12 \times 10^6$ roentgens. A definite deep browning of the glass sample was observed which was unsightly and unsatisfactory.

Example II

A borosilicate glass composition was employed containing the ingredients set forth below in parts by weight.

| | |
|---|---|
| $SiO_2$ | 74.60 |
| $B_2O_3$ | 9.50 |
| $Al_2O_3$ | 5.50 |
| $Na_2O$ | 6.60 |
| $K_2O$ | 0.60 |
| CaO | 0.90 |
| BaO | 2.20 |
| $Fe_2O_3$ | 0.05 |
| Cl | 0.20 |
| F | 0.10 |

CuO was added in the amount of 0.10% by weight. The resulting glass was a blue flint glass. A sample of the glass was exposed to X-ray radiation of about $12 \times 10^6$ roentgens and showed only very mild browning which was satisfactory for the intended purpose.

Example III

Using a base glass composition of the identical formulation as set forth in Example II, an amount of 0.40% by weight of CuO was added thereto. The resulting glass was light blue. A sample of this glass was taken and exposed to X-ray radiation of about $12 \times 10^6$ roentgens. The glass showed only extremely mild browning and was considered satisfactory for the intended purposes.

Although the above examples show borosilicate glasses, other base glass compositions can be employed according to the present invention with satisfactory results. Another example of a base glass is soda-lime containing the following ingredients by weight:

| | |
|---|---|
| $SiO_2$ | 73.37 |
| $Al_2O_3$ | 1.20 |
| CaO | 6.80 |
| MgO | 4.80 |
| $Na_2O$ | 13.60 |
| $K_2O$ | 0.20 |
| $Fe_2O_3$ | 0.03 |

Glasses of the present invention can be employed for the production of containers for the packaging of a wide variety of materials. It is readily apparent that the glass compositions of the present invention enable the fabrication of containers which are resistant to discoloration and at the same time do not become undesirably affected by the coloration imparted by the CuO itself.

What is claimed is:

1. A method for making glass compositions which normally discolor when exposed to sterilizing radiation, the improvement whereby undesirable browing discoloration of the glass when subjected to radiation is substantially reduced, comprising incorporating in the base glass composition from about 0.10 to about 0.40% by weight of CuO, based on the weight of the base glass composition.

2. In a method for making glass compositions which normally discolor when exposed to sterilizing radiation, the improvement whereby the undesirable browning discoloration of the glass when subjected to radiation is substantially reduced comprising incorporating in the base glass composition about 0.10% by weight of CuO, based on the weight of the base glass composition.

3. In the method for making glass compositions which normally discolor when exposed to sterilizing radiation, the improvement whereby the undesirable browning discoloration of the glass when subjected to radiation is substantially reduced comprising incorporating in the base glass composition about 0.40% by weight of CuO, based on the weight of the base glass composition.

4. In a method for making glass containers which normally tend to discolor when exposed to sterilizing radiation, the improvement whereby the undesirable browning discoloration of said glass containers when said glass containers are exposed to radiation is substantially reduced comprising adding to the base glass composition about 0.10% to about 0.40% by weight of CuO, based on the weight of the base glass composition.

5. In a method for making glass containers which normally tend to discolor when disposed to sterilizing radiation, the improvement whereby the undesirable browning discoloration of said glass containers when subjected to radiation is substantially reduced, comprising adding to the base glass composition about 0.10% by weight of CuO based on the weight of the base glass composition.

6. In a method for making glass containers which normally tend to discolor when exposed to sterilizing radiation, the improvement whereby the undesirable browning discoloration of said glass containers when subjected to radiation is substantially reduced, comprising adding to the base glass composition about 0.40% by weight of CuO, based on the weight of the base glass composition.

7. In the method as defined in claim 1 wherein the base glass is a soda-lime glass.

8. In the method as defined in claim 1 wherein the base glass is a borosilicate glass.

9. In the method as defined in claim 7 wherein the soda-lime glass has the composition:

| | |
|---|---|
| $SiO_2$ | 73.37 |
| $Al_2O_3$ | 1.20 |
| CaO | 6.80 |
| MgO | 4.80 |
| $Na_2O$ | 13.60 |
| $K_2O$ | 0.20 |
| $Fe_2O_3$ | 0.03 |

10. In the method as defined in claim 8 wherein the borosilicate glass has the composition:

| | |
|---|---|
| $SiO_2$ | 74.60 |
| $B_2O_3$ | 9.50 |
| $Al_2O_3$ | 5.50 |
| $Na_2O$ | 6.60 |
| $K_2O$ | 0.60 |
| CaO | 0.90 |
| BaO | 2.20 |
| $Fe_2O_3$ | 0.20 |
| Cl | 0.20 |
| F | 0.10 |

11. In the method for making glass containers which normally discolor when exposed to X-radiation of $12 \times 10^6$ roentgens, the improvement whereby undesirable browning discoloration of the glass when subjected to said radiation is substantially reduced, comprising incorporating into the base glass composition from about 0.10 to about 0.40% by weight of CuO based on the weight of the base glass composition whereby said glass has a light blue appearance and does not show substantial browning after exposure to said radiation.

References Cited

UNITED STATES PATENTS

Re. 25,456  10/1963  Bacon et al. _____ 106—52

HELEN M. McCARTHY, *Primary Examiner.*